United States Patent [19]
Solmsdorf

[11] Patent Number: 5,808,758
[45] Date of Patent: Sep. 15, 1998

[54] DATA CARRIER WITH AN OPTICALLY VARIABLE ELEMENT

[75] Inventor: Bernhard Solmsdorf, Lutzingen, Germany

[73] Assignee: Geisecke & Devrient, GmbH, Munich, Germany

[21] Appl. No.: 579,600

[22] Filed: Dec. 26, 1995

[30] Foreign Application Priority Data

Dec. 23, 1994 [DE] Germany ............ 44 46 368.5

[51] Int. Cl.$^6$ .......... G06K 19/16; G06K 19/14; B42D 15/10
[52] U.S. Cl. ............ 359/2; 283/91; 283/902
[58] Field of Search ............ 359/2, 567, 565, 359/571, 572; 289/91, 86, 902, 903, 904

[56] References Cited

U.S. PATENT DOCUMENTS

| | | |
|---|---|---|
| 4,033,059 | 7/1977 | Hutton et al. .............. 283/91 |
| 4,184,700 | 1/1980 | Greenaway .............. 283/91 |
| 4,715,623 | 12/1987 | Roule et al. .............. 283/91 |
| 4,932,685 | 6/1990 | Mancuso .............. 283/91 |
| 5,128,779 | 7/1992 | Mallik .............. 359/2 |
| 5,310,222 | 5/1994 | Chatwin et al. .............. 359/2 |
| 5,331,443 | 7/1994 | Stanisci .............. 359/2 |
| 5,344,192 | 9/1994 | Phillips .............. 283/91 |
| 5,351,142 | 9/1994 | Cueli .............. 359/2 |
| 5,492,370 | 2/1996 | Chatwin et al. .............. 359/2 |

FOREIGN PATENT DOCUMENTS 2334702  1/1974  Germany .

Primary Examiner—Jon W. Henry
Attorney, Agent, or Firm—Stevens, Davis, Miller & Mosher, L.L.P.

[57] ABSTRACT

A data carrier with an optically variable element has a layer regularly reflecting incident light and including interruptions. A diffusely scattering layer is disposed on the regularly reflecting layer so as to be visible through at least one interruption to provide at least one optically recognizable marking based on the differences in the reflectivities of the two layers at different viewing angles.

20 Claims, 2 Drawing Sheets

DATA CARRIER WITH AN OPTICALLY VARIABLE ELEMENT

BACKGROUND OF THE INVENTION

This invention relates to a data carrier with an optically variable element which has a layer regularly reflecting incident light and bearing markings in the form of characters, patterns, pictures or logos.

Optically variable elements have been known in various embodiments for a few decades. Optically variable elements are used in a great variety of fields, e.g. the advertising trade, decoration, and the security field, for example for marking the authenticity of data carriers.

These elements have in common that they show different optical effects depending on the viewing and lighting angles. The elements are applied to a data carrier for example as separate optically variable elements in the form of diffraction grids, holograms or cinegrams. Using holograms for protecting data carriers one can apply a visually appealing and optically variable element with technologies known today, but the production of the hologram involves considerable costs due particularly to the production of the so-called hologram master. These costs can only be reduced, per individual hologram, by producing an accordingly high number of transfer holograms from the particular hologram master produced. This technology is thus suitable only for large series, in which the relatively high costs for producing the master can be distributed over a high number of data carriers. Consequently, this technology is rather inflexible with respect to wishes to make changes in the design of the optically variable element.

Furthermore, one can use printing technologies for applying an optically variable element to a data carrier.

For protecting papers of value it is known for example from DE 23 34 702 to produce an optically variable element on an antifalsification paper by special gravure printing. The printing is done in such a way that three-dimensional line patterns arise on the antifalsification paper which differ either in their height or their alignment in such a way that picture elements become visible or disappear when the paper is viewed at perpendicular and slanting angles of incidence. In this way one can apply information to the data carrier which is visible only at certain viewing angles.

A peculiarity of such so-called latent images is that the information is visible exclusively at certain definite viewing angles. To check the information applied to the data carrier one must thus put it in the correct angle position relative to one's eye to be able to recognize the information. Furthermore, such optically variable elements produced by printing have the disadvantage that they are often difficult to recognize.

The problem of the invention is thus to provide a data carrier with an optically variable element in which information is incorporated, the data carrier being cost-effective to produce, the information incorporated in the optically variable element being easy to recognize at all viewing angles, and the information having a viewing angle-dependent effect.

SUMMARY OF THE INVENTION

The basic idea of the invention is to combine a regularly reflecting surface with a diffusely scattering surface area, i.e. to replace the reflecting surface by a diffusely scattering one in partial areas.

Reflected radiation fundamentally has different intensities when the reflecting layer is observed at different viewing angles. When the reflecting surface is replaced by a diffusely scattering surface area in partial areas, the viewing angle-dependent intensity pattern of the reflected radiation is superimposed by an intensity substantially constant at all viewing angles which is produced by the diffusely scattering surface areas. Depending on the viewing angle the viewer thus has the impression that the reflecting surface background appears lighter than the diffusely scattering surface areas at certain angles, while the diffusely scattering surface areas appear lighter than the reflecting areas at other angles. If the combination of diffusely scattering surface areas with regularly reflecting areas produces optically perceptible information, such as pictures, logos, characters or the like, one obtains an optically variable element which has a different appearance at different viewing angles but whose information content is visible at all viewing angles. Only the optical appearance changes from light to dark or dark to light, which generally arouses the optical impression of an alternation between a "positive" image and a "negative" image. This positive-negative alternating image is especially distinct if the information is applied as a so-called halftone image by one of the known techniques, such as the dither method.

In a preferred embodiment the inventive data carrier consists in an identity card which has at least in a partial area a diffusely scattering layer covered by a highly reflecting metal layer. The metal layer is interrupted in partial areas so that the subjacent diffusely scattering layer becomes visible there. The interruptions of the metal layer have for example the shape of characters, patterns, pictures, logos or the like. When the data carrier surface is viewed almost perpendicular the interruptions of the metal layer appear light against the darker-seeming metallic background. However when the data carrier is tilted and viewed on a slant the maximum intensity of the radiation regularly reflected by the metal layer falls on the viewer's eye at a certain viewing angle. At this angle the optical impression changes so that the metallic background outshines the diffusely scattering surface areas and appears lighter than them.

In a certain viewing angle range one thus has the impression of a contrast reversal between foreground and background, which leads to a change of positive and negative character or picture representation.

The high intensity difference between the reflecting and diffusely scattering layers results in a contrast excellently recognized by the eye, which also stands out clearly when the data carrier is tilted so that the information is clearly recognizable at all viewing angles.

The data carrier furthermore has excellent protection against copying since the reflecting layer necessary for producing the tilting effect cannot be produced with the help of copying machines so that the optically variable effect gets lost in the copy.

A further advantage results from exposing the diffusely scattering layer under the regularly reflecting layer with the help of a laser beam to produce the information. This technology permits the information to be incorporated in an otherwise completed card in a last operation. One thus has the possibility of incorporating individual data in the data carrier in the form of optically variable information, on the one hand, and reacting very flexibly to desired changes of design, on the other hand.

Further embodiments and advantageous developments of the invention will result from the following examples explained with reference to schematic figures, whose representation is deliberately not true to scale to increase its clarity.

FIG. 1 shows an inventive identity card,

FIG. 2 shows the relative intensity for regularly reflected and diffusely scattered radiation as a function of the viewing angle, FIG. 3a shows an inventive identity card when viewed outside the angle of reflection of the reflecting layer, FIG. 3b shows the inventive identity card when viewed at the angle of reflection of the reflecting layer, FIG. 4 shows an inventive identity card in a sectional view, FIG. 5 shows a further embodiment of the inventive identity card in a sectional view, FIG. 6 shows a further embodiment of the inventive identity card in a sectional view, FIG. 7a shows an enlarged detail of the inventive identity card when viewed outside the angle of reflection of the reflecting layer, FIG. 7b shows an enlarged detail of the inventive identity card when viewed at the angle of reflection of the reflecting layer.

DETAILED DESCRIPTION

Figure 1:
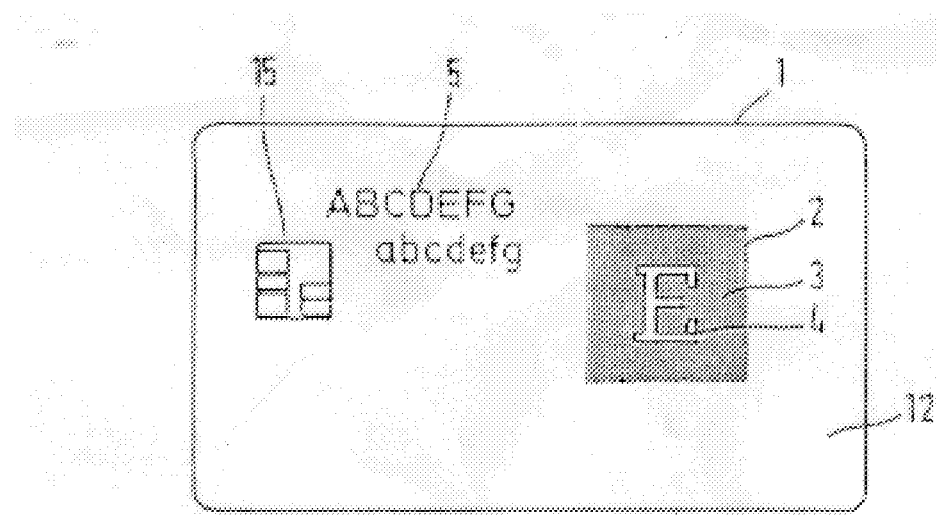

FIG. 1 shows schematically an inventive data carrier in the form of identity card 1 provided with optically variable element 2. Optically variable element 2 is applied to surface 12 of the card as a transfer element, and consists of regularly reflecting layer 3 and marking 4 which was produced by local removal of regularly reflecting layer 3 in the shape of the letter "E". Removal of regularly reflecting layer 3 makes a subjacent diffusely scattering surface area visible. In addition to optically variable element 2 the card can contain printed data 5, integrated circuit 15, a magnetic stripe or other additional elements in or on one of its layers.

Markings 4 are preferably applied so that they form alphanumeric characters, logos, pictures, in particular halftone images like the photo of the owner, personal data or the like.

When the card is illuminated at fixed angle of incidence $\theta_E$ to the plane in which the surface of the card is located, the incident light is reflected by regularly reflecting part 3 of optically variable element 2 at predetermined solid angle $\theta_R$. In the ideal case no intensity based on reflection by layer 3 is therefore measurable or visible at an angle outside $\theta_R$.

However, actual ambient conditions in daylight always cause light with the highest intensity to fall on the data carrier at angle $\theta_E$, but also scattered light with low intensity to hit the data carrier from other directions, so that reflection takes place in almost all angle ranges, the highest intensity being in a certain solid angle element $\Delta\theta$.

Figure 2:
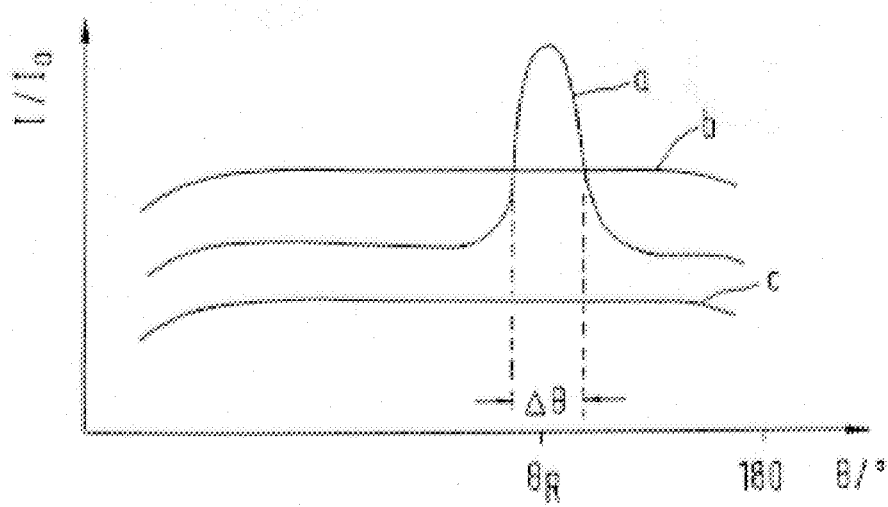

FIG. 2 shows schematically relative intensity pattern $I/I_O$ for various viewing angles $\theta$ which results for such a regularly reflecting metal layer when illuminated under normal ambient conditions. Curve a representing the intensity pattern for regularly reflecting layer 3 has a distinct maximum at angle $\theta_R$. The same figure also shows the relative intensity of a diffusely scattering, poorly absorbing layer (b) and a diffusely scattering, highly absorbing layer (c). The intersecting points of graphs a and b define solid angle element $\Delta\theta$ in which the intensity of reflected radiation exceeds the intensity of diffusely scattered radiation.

When an optically variable element consisting of a regularly reflecting layer and diffusely scattering surface elements interrupting this layer is observed at different viewing angles, the diffusely scattering surface elements appear light against a dark background at most viewing angles. In the range of viewing angle element $\Delta\theta$, however, the light intensity fraction of diffusely scattering surface elements 4 is clearly exceeded by the light intensity fraction of regularly reflecting surface 3 so that a contrast reversal occurs in this viewing angle range.

Figures 3A, 3B:
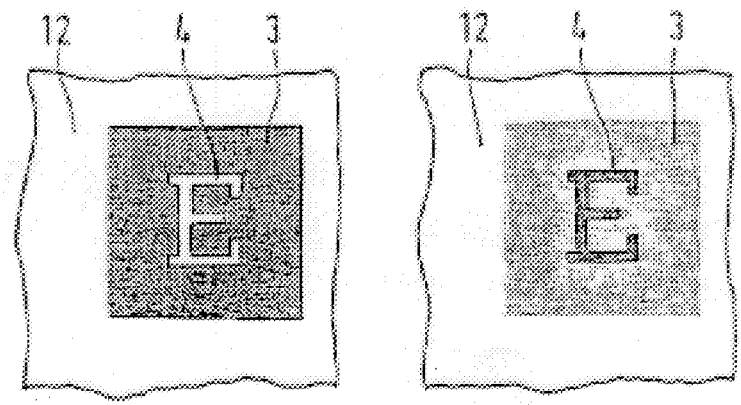

FIG. 3a shows a detail of the inventive data carrier according to FIG. 1. The viewing angle is thus outside viewing angle range $\Delta\theta$ so that the letter "E" can be recognized as bright gap 4 within gray metal layer 3.

When the card is turned so that the viewing angle falls within reflection range $\Delta\theta$ of the regularly reflecting metal layer, the intensity relations are reversed and gap "E" appears dark against a light background. FIG. 3b shows the same detail of the data carrier when viewed at angle of reflection $\theta_R$ of the reflecting layer. Surface element 4 now appears dark against light, regularly reflecting background 3. However the information content incorporated in the optically variable element, in this case in the shape of a letter "E", is retained at all viewing angles.

Figure 4:
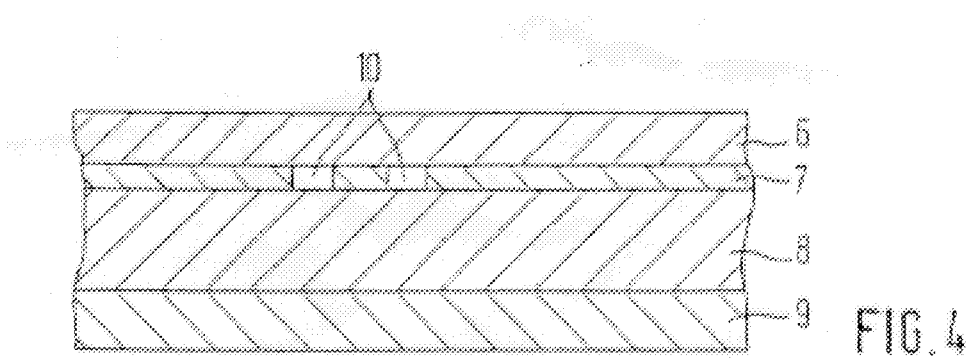

FIG. 4 shows schematically a possible structure of the inventive data carrier in cross section in the area of the optically variable element. Under transparent card cover layer 6 there is regularly reflecting metal layer 7 which in turn covers diffusely scattering layer 8 which serves simultaneously as a card core layer. Card core layer 8 is covered by second transparent or opaque card cover layer 9.

A laser beam is used to locally remove layer 7 completely so that layer interruptions 10 make diffusely scattering layer 8 visible there. Depending on the reflecting power of layer 7 a color can be chosen for layer 8 which only absorbs fractions of the incident light. Especially suitable colors for this purpose are poorly absorbing color tones like white, yellow, light blue or the various well-known pastels. When selecting the properties of layer 8 one should always make sure the intensity of the regularly reflecting layer is not above that of diffusely scattering layer 8 (curve c in FIG. 2) at all viewing angles, since the contrast reversal will otherwise not occur at any viewing angle. The absorption properties of layer 8 are thus fundamentally dependent on the reflectivity of layer 7 used, but only poorly absorbing color layers are generally to be chosen. The amount of acceptable absorption is dependent on the reflecting power of regularly reflecting layer 7 located thereabove.

For layer 7 one can use any material which reflects visible incident radiation regularly, such as a metal layer, metallically lustrous layer or metal-coated layer. Furthermore one can use a material whose structure causes it to scatter light exclusively or preferably into a certain solid angle element. This includes e.g. sawtooth profiles or diffraction grids incorporated in or applied to layers of any material.

Figure 5:
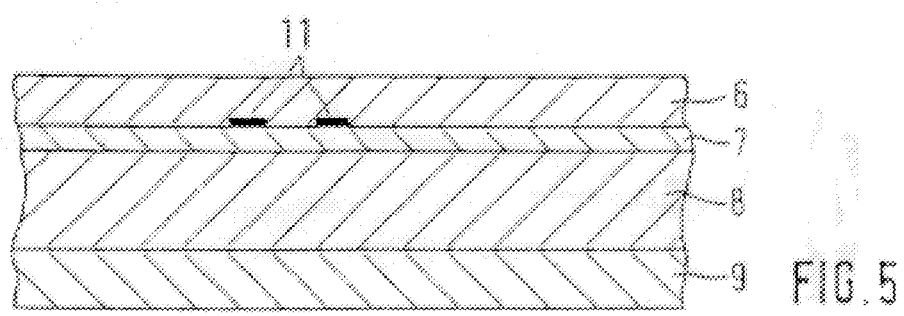

FIG. 5 shows a further embodiment of the inventive data carrier. Under transparent cover layer 6 there is regularly reflecting layer 7 which is provided with prints 11 in a diffusely scattering color. Under layer 7 there is core layer 8 which is covered on the back by transparent or opaque back cover layer 9. This embodiment is of advantage especially if the data incorporated in the optically variable element are already applied during production of the optically variable element, or these data are to have a color different from the color of core layer 8. Furthermore, several different prints 11 can be applied to the surface of layer 7, which also differ from one another by their coloring. For producing the print on layer 7 the same selection conditions hold for the inks as were described above for layer 8. The selected inks must diffusely scatter incident light, the intensity of scattered light at least in one angle range being above the intensity which the regularly reflecting metal layer has at this angle.

The inventive data carrier can of course also be produced by changing the regularly reflecting layer in partial areas in such a way as to transform the original reflecting properties into diffusely scattering properties. It has turned out to be especially advantageous to dim, for example roughen, metal layers only in certain areas in the shape of the desired markings, so that their reflecting property gets lost and only diffusely scattering areas of the metal layer arise, without this layer being completely removed. This method can be performed using mechanical chisels or scrapers which are guided over the surface of the metal layer so as to roughen it. Furthermore a low dosed laser beam can likewise be used to impair the luster of the surface so that the irradiated areas show no more regular reflection although the metal layer was not removed at these points. With layers producing regular reflection in a different way, for example the sawtooth pattern described above, there is furthermore the possibility of covering or filling the structures causing regular reflection. In the case of the sawtooth pattern the depth profile of the layer can be changed for example by being filled with a transparent, translucent or opaque color in the form of the marking in such a way that the regular reflection is replaced by diffuse scattering in the chromophoric partial areas.

Figure 6:
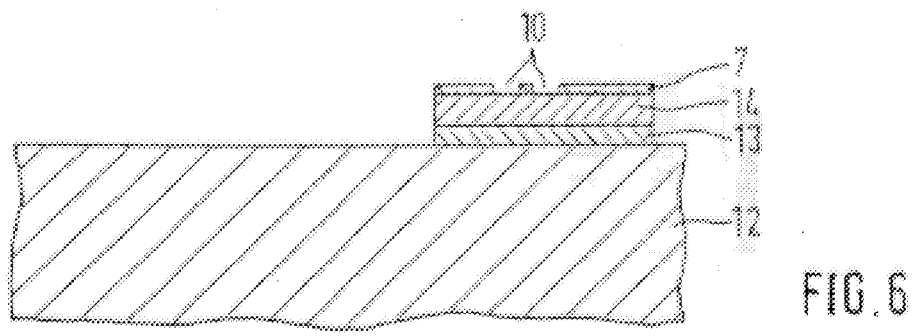

For some data carriers and production methods it can be of advantage to apply the inventive optically variable element to the surface of the data carrier by a transfer method only after completion of the data carrier. The data carrier can be for example an identity card, paper of value, such as bank note, passport, passport personalization page or other document whose structure can hardly be influenced during production. With such data carriers the optically variable element is applied to the surface of data carrier 12. As shown in FIG. 6, the optically variable element preferably consists of adhesive layer 13, diffusely scattering layer 14 and regularly reflecting layer 7. Using common transfer methods, such as the hot stamping method, it is possible to position and fix such optically variable elements selectively on the surface of data carrier 12, the surface of data carrier 12 preferably being of smooth design in the area where the optically variable element is applied. In cases in which the adhesive layer already fulfills the requirements for a diffusely scattering layer, layer 14 can also be dispensed with.

If the diffusely scattering areas are made visible by locally removing the surface of the regularly reflecting layer, one can use different working methods. These include above all locally removing the layer with the help of a laser, removing the regularly reflecting metal layer with the help of mechanical engraving methods or the like. Removal with the help of a laser has the advantage that the metal layer can also be removed in the interior of a laminar compound, so that the optically variable element can be individually designed or personalized after completion of the entire data carrier. This specifically offers the possibilities of including the personal data of an identity card, the photo of the card owner, his fingerprint or the like in the optically variable element. Furthermore such a procedure offers the possibility of producing individual series if there is a great number of prefabricated data carriers, the series having the common feature of an identical optically variable element which can be provided with the individual features of the series easily and quickly with the help of a laser.

The size or shape of the optically variable element to be applied is subject to no technical restrictions. For example, regularly reflecting layers can be incorporated in the interior of a card structure over the entire surface or only in partial areas. The optically variable elements applied to the surface of a data carrier by a transfer method can also be applied in any desired shape, so that they are already effective for example due to their contour and the additionally incorporated diffusely scattering surface elements. For example, the optically variable elements can be incorporated in the data carrier or applied to its surface in a circular, star or rectangular shape or any other geometric shape. Furthermore, optically variable elements can be incorporated in the data carrier which extend from one edge of the data carrier to the other or interconnect two adjoining edges.

Figure 7A:
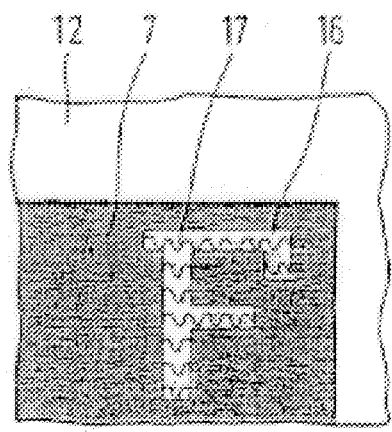
Figure 7B:
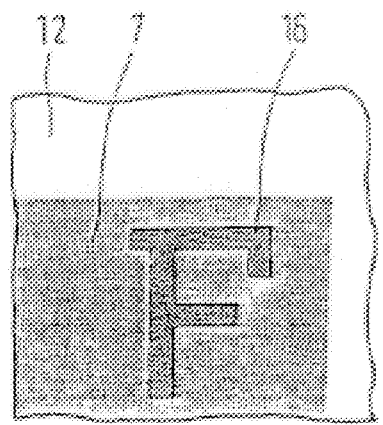

As shown in an enlarged detail of the inventive data carrier in FIG. 7a, the data carrier in a further embodiment has diffusely scattering surface area 16 in which additional information 17 is incorporated in the form of patterns or characters. In terms of contrast the information differs little from diffusely scattering surface area 16 so that when the data carrier is viewed at angle of reflection $\theta_R$ both diffusely scattering surface area 16 and information 17 are outshone by regularly reflecting layer 3. Thus, as shown in FIG. 7b, the optically variable element makes diffusely scattering surface area 4 appear dark against light background 7 when viewed at angle of reflection $\theta_R$, whereby information 17 disappears completely when viewed at this angle. To attain this effect information 17 can be incorporated in surface area 16 for example by being printed in a diffusely scattering color contrasting little with surface area 16. It is especially suitable for this purpose to print a light color, for example yellow, light blue or pastel, on a light, for example white, background. However, markings 17 can also be incorporated in surface area 16 by local depressions, for example scratching or colorless lasering, without any additional color being applied.

The inventive data carrier can be supplemented by a further optically variable effect in the above examples. For this purpose one applies to a data carrier a hologram having in one of its upper layers a regularly reflecting surface whose direction of reflection is determined by the subjacent edge steepness of the holographic embossing. Since the regularly reflecting layer of the hologram has thereunder a further layer having the property of diffusely scattering incident radiation, removal of the metal layer, for example with the help of a laser, permits the effect described in the preceding examples to be combined with the optically variable effects of the hologram. In this way one can incorporate the above-described optically variable markings in the data carrier, whereby the intensity of the laser beam can be controlled in such a way that the optically variable properties of the hologram are substantially retained and the holographic total information can be superimposed by a picture which appears positive at certain viewing angles and negative at other viewing angles.

I claim:

1. A data carrier with an optically variable element disposed thereon, the optically variable element comprising:
    a regularly reflecting layer which regularly reflects light incident thereon, the regularly reflecting layer having at least one interruption; and
    a diffusely scattering layer which diffusely scatters light incident thereon, the diffusely scattering layer being disposed on the regularly reflecting layer so as to be visible through the at least one interruption in the regularly reflecting layer such that the diffusely scattering layer and the at least one interruption form at least one optically recognizable marking;
    the diffusely scattering layer having a first reflectivity which is substantially constant at all viewing angles and being produced by changing the regularly reflecting surface; and the regularly reflecting layer having a second reflectivity which is lower than the first reflectivity for at least one viewing angle and higher than the first reflectivity for at least one other viewing angle.

2. The data carrier of claim 1, characterized in that the regularly reflecting layer is a metal layer, a metallically lustrous layer or a metal-coated layer.

3. The data carrier of claim 2, characterized in that the diffusely scattering layer is a dimmed partial area of the metal layer.

4. The data carrier of claim 1, characterized in that the regularly reflecting surface is a sawtooth pattern, and the diffusely scattering surface element was produced by filling the sawtooth pattern with a color.

5. The data carrier of claim 1, characterized in that the optically variable element is formed as a transfer element and applied to a remainder of the data carrier.

6. The data carrier of claim 1, characterized in that the at least one optically recognizable marking comprises a half-tone image.

7. The data carrier of claim 3, characterized in that the dimmed partial area of the metal layer comprises a roughened part of the metal layer.

8. A data carrier with an optically variable element disposed thereon, the optically variable element comprising:

a regularly reflecting layer which regularly reflects light incident thereon, the regularly reflecting layer having at least one interruption; and a diffusely scattering layer which diffusely scatters light incident thereon, the diffusely scattering layer being disposed on the regularly reflecting layer so as to be visible through the at least one interruption in the regularly reflecting layer such that the diffusely scattering layer and the at least one interruption form at least one optically recognizable marking;

the diffusely scattering layer having a first reflectivity which is substantially constant at all viewing angles; and the regularly reflecting layer being a metal layer, a metallically lustrous layer or a metal-coated layer and having a second reflectivity which is lower than the first reflectivity for at least one viewing angle and higher than the first reflectivity for at least one other viewing angle.

9. The data carrier of claim 8, characterized in that the optically variable element is formed as a transfer element and applied to a remainder of the data carrier.

10. The data carrier of claim 8, characterized in that the at least one optically recognizable marking comprises a half-tone image.

11. The data carrier of claim 8, characterized in that the diffusely scattering layer is disposed under the regularly reflecting layer.

12. The data carrier of claim 8, characterized in that the diffusely scattering layer comprises indicia indicating additional information, the indicia being disposed on at least a portion of the diffusely scattering layer which is visible through the at least one interruption.

13. The data carrier of claim 9, characterized in that the transfer element comprises an adhesive layer for adhering the transfer element to the remainder of the data carrier.

14. The data carrier of claim 9, further comprising a data carrier substrate, wherein the diffusely scattering layer is disposed between the regularly reflecting layer and the data carrier substrate.

15. The data carrier of claim 13, characterized in that the adhesive layer is poorly absorbing in a visible wavelength range.

16. The data carrier of claim 8, characterized in that the regularly reflecting layer has a sawtooth profile or diffraction grid.

17. The data carrier of claim 8, characterized in that the interruptions are incorporated using a laser.

18. The data carrier of claim 8, characterized in that the diffusely scattering layer is colored in a poorly absorbing color.

19. The data carrier of claim 18, characterized in that the diffusely scattering layer is white, yellow, light blue or pastel.

20. The data carrier of claim 12, characterized in that the additional information comprises patterns or characters.

* * * * *